United States Patent Office.

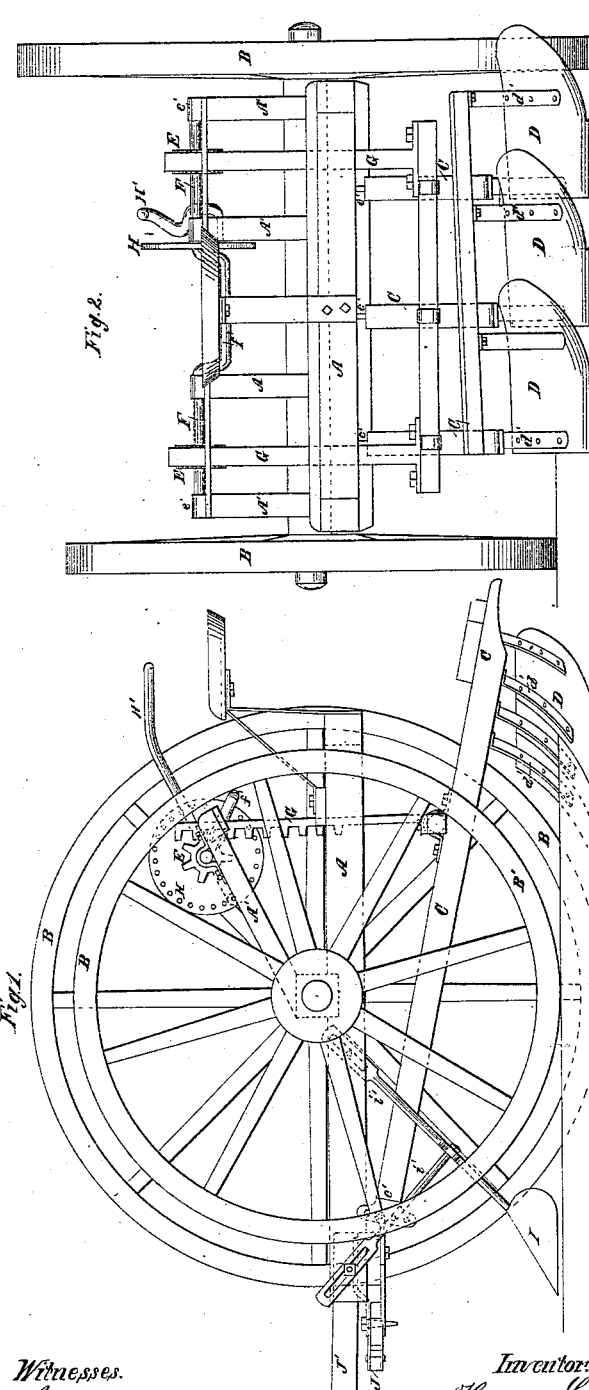

HORACE L. PERRY, OF AURORA, NEW YORK.

Letters Patent No. 64,358, dated April 30, 1867.

---

GANG-PLOUGHS.

---

The Schedule referred to in these Letters Patent and making part of the same.

---

TO ALL WHOM IT MAY CONCERN:

Be it known that I, HORACE L. PERRY, of Aurora, in the county of Erie, and State of New York, have invented certain new and useful improvements in Gang-Ploughs; and I do hereby declare that the following is a full and exact description thereof, reference being had to the accompanying drawings, making a part of this specification, in which—

Figure I is a side elevation, and

Figure II a rear end elevation.

The nature of this invention consists, first, in the construction and use of two, three, or more cast-steel mould-boards securely fastened to an adjustable plough-frame by means of appropriate braces, the said plough-frame being hinged to the forward end of a main frame supported upon two wheels of unequal diameter in such manner that the larger wheel travels in the furrow and the smaller wheel upon the even ground, thereby keeping the main frame and plough-frame level, and so that the wheels will be abundantly able to guide the ploughs in the desired direction without the aid of the so-called land-side, which forms part of a plough of common construction; second, in the manner of raising and lowering and adjusting the plough-frame upon the main frame by means of two upright racks hinged to the plough-frame, and two corresponding pinions upon a horizontal shaft, having its bearings upon the main frame of the machine, a crank being formed upon the said shaft between the said pinions, and a ratchet-wheel and stop-lever upon one side of the crank, in such manner that while the front end of the plough-frame is hinged to the main frame, forming a fulcrum upon which the plough-frame swings, its rear end (and the ploughs attached thereto) may be raised from the ground for the purpose of moving the machine from field to field, or lowered so as to guide the ploughs into the ground, and by means of the ratchet-wheel and lever determine the depth of the furrow to be cut; third, in the combination with a gang-plough having mould-boards but no land-sides, and being supported upon two wheels of unequal diameter, and depending upon the movement of the wheels to direct that of the ploughs, of an additional or surface plough, adjusted in front of one or both of the wheels for the purpose of clearing the track of obstructions, such as stubbles, stones, lumps or hills of earth, and the like.

Letters of like name and kind refer to like parts in each of the figures.

A represents the main frame of the machine, which is supported upon the wheels B and B'. The wheel B is made about one foot larger in diameter than the wheel B', the former being intended to travel in the previously made furrow, and the latter upon the even ground, thus keeping the main frame and the other parts attached thereto on a perfect level. C represents the plough-frame. Its forward end is hinged to the main frame as shown at $c'$, and swings upon this hinge as a fulcrum. The rear end of the plough-frame carries the ploughs D, which may be two, three, or four in number. These ploughs consist simply of a cast-steel mould-board securely attached to the bottom side of the plough-frame by means of bars or braces $d'$. The so-called land-side is dispensed with in the construction of these ploughs, for it is intended that the wheels B B' will keep in line and guide the movement of the ploughs without its aid, thereby obviating the friction caused by the pressure of the land-side against the solid ground. E E represent two pinions supported upon the crank-shaft F, which has bearings $e'$ upon the projecting timbers A' of the main frame A. The crank $f'$ is formed between the pinions E. G G represent two racks, which are hinged to the plough-frame and project upwardly in a manner to gear with the pinions E E. H represents a ratchet or cog-wheel keyed to the shaft F upon one side of the crank, and H' is a stop-lever, having its fulcrum upon one of the timbers A', and extending backward to within convenient reach of the driver. The other end of this lever is provided with one or more cogs or stop-pins, which may be made to engage the teeth of the wheel H and hold the same, thereby preventing the shaft F from revolving in either or both directions. By this means the plough-frame may be raised so as to lift the ploughs above the surface of the ground, and held in that position for the purposes of moving the machine from field to field and turning around at the end of each furrow. When the machine is ploughing the wheel and lever H H' may also serve the purpose of determining the depth of furrow to be cut. I represents a surface-plough, made adjustable to the main frame by means of brace-bars $i'$, as shown in Fig. I. It is placed directly in front of the wheel B', in such proximity to the ground as to cut away or otherwise remove all obstructions, such as stubbles, stones, lumps or hills of earth, and the like, thereby allowing the wheel to advance on a level, and the frames and ploughs to retain a uniform horizontal position. The eveners are represented at J and the poles at J'. Three horses will be required to draw a gang of three ploughs, and one of the horses will therefore travel in the furrow in front of the wheel B, while the others walk upon the even ground.

The operation of this machine is very simple, and can be readily seen and understood upon examining the drawings.

What I claim as my invention, and desire to secure by Letters Patent, is—

1. The cast-steel ploughs D, when constructed and used in combination with the hinged plough-frame C, main frame A, and wheels B B', for the purposes and substantially as herein described.

2. The combination and arrangement of the pinions E E, crank-shaft F, hinged racks G G, ratchet-wheel H, and stop-lever H', for the purposes and substantially as herein set forth.

HORACE L. PERRY.

Witnesses:
    B. H. MUEHLE,
    F. A. LANGWORTHY.